United States Patent [19]
Byron

[11] Patent Number: 5,148,637
[45] Date of Patent: Sep. 22, 1992

[54] LENS EDGING SYSTEM WITH PROGRAMMABLE FEED AND SPEED CONTROL

[75] Inventor: David L. Byron, Honeoye Fall, N.Y.

[73] Assignee: Bausch & Lomb Incorporated, Rochester, N.Y.

[21] Appl. No.: 803,711

[22] Filed: Dec. 4, 1991

Related U.S. Application Data

[63] Continuation of Ser. No. 485,426, Feb. 27, 1990, abandoned.

[51] Int. Cl.$^5$ .............................................. B24B 49/00
[52] U.S. Cl. .............................. 51/165.71; 51/165.77; 51/105 LG; 51/284 E; 51/101 LG
[58] Field of Search ........... 51/165.71, 165.74, 165.76, 51/165.77, 215 R, 215 AR, 215 UE, 284 R, 284 E, 105 LG, 106 LG, 101 LG

[56] References Cited

U.S. PATENT DOCUMENTS

| | | | |
|---|---|---|---|
| 4,520,596 | 6/1985 | Otto et al. ...................... | 51/215 UE |
| 4,829,715 | 5/1989 | Langlois et al. ................. | 51/284 E |
| 4,870,784 | 10/1989 | Ramos .................................. | 51/165 |

Primary Examiner—M. Rachuba
Attorney, Agent, or Firm—Salvatore P. Pace

[57] ABSTRACT

A computer numerical control machine system for edging lenses controls the rotation and displacement of a lens workpiece with respect to a edging tool in accordance with a lens shape stored in memory. The system continuously translates the lens workpiece axially across the surface of the wheel to uniformly distribute wear across the wheel surface, reducing the need to dress the edging tool. The system compares the lens size with predetermined dimensions and compenates for any difference by automatically adjusting the lens trajectory during the edging of subsequent lens workpieces, permitting the edging tool to wear down without appreciable errors in lens size. The system controls the edging tool speed, the lens rotation rate, the lens axial feed velocity and the grinding force between the lens workpiece and the wheel at each discrete point during the entire lens edging operation to optimize production while preventing overheating of the lens workpiece. The optimum values for these parameters are empirically determined in a preparatory programmed trial and error learning process of the invention.

21 Claims, 9 Drawing Sheets

LENS EDGING SYSTEM WITH PROGRAMMABLE FEED AND SPEED CONTROL

This is a continuation of copending application Ser. No. 07/485,426 filed on Feb. 27, 1990 now abandoned.

BACKGROUND OF THE INVENTION

1. Technical Field

The invention lies in the field of lens edging machines for shaping lenses from glass blanks.

2. Background Art

Lens edging machines are well-known in the art, one type being described, for example, in U.S. Pat. No. 4,870,784 to Ramos et al. Typically, a lens is formed from a blank having a certain curvature in accordance with the desired optical focusing power. The curvature of an ophthalmic lens provides a corrective focusing power. The lens curvature for dark glasses or sun glasses typically provides no corrective focusing power. Having formed the lens blank with the desired curvature, the lens must be "cut" out of the blank in a shape which fits into the frame of the glasses. This is accomplished by "edging", or grinding the edges of the lens with an edging tool such as a grinding wheel until the desired lens shape is reached. If the lens is ophthalmic, the edging process may be performed by a lens edging machine of the type described in the above-referenced patent to Ramos et al. which uses a groove in the grinding wheel to bevel the lens edge. Another type of lens edging machine typically employed to make non-ophthalmic lenses uses an apex in its grinding wheel to bevel the lens edge. The bevel on the lens edge enables the lens to fit tightly into the frames of the eye glasses or sun glasses. Both types of lens edging machines rotate the lens blank with respect to the grinding wheel. Simultaneously, as the lens blank is rotated, the machine changes the displacement between the center of the lens blank and the wheel in accordance with the shape of the lens to be formed from the lens blank. In both types of lens edging machines discussed above, the displacement is changed by means of a cam having the desired lens shape which rotates with the lens blank against a stationary surface, as is well-known in the art. One problem with this feature is that the machine operation must be halted and the cam changed each time a different lens shape is to be made. After the lens has been formed from the lens blank, it is beveled, as mentioned above. The lens edge is then smoothed or polished to complete the process.

Current methods of lens edging are plagued by inconsistent quality manifested as out-of-tolerance conditions and non-uniformity between lenses. There are several causes. First, the grinding wheel, which typically is a diamond-like material or any material suitable for grinding the lens, continually wears and becomes gradually smaller during use, resulting in increasing lens size. Secondly, the cam and the surface against which it must move and rub continually wear, resulting in greater slipping and vibration which distorts the lens shape determined by the motion of the cam. The present method is also plagued by high maintenance costs and down-time, due to the fact that the grinding wheel wears out in a non-uniform manner, and must be dressed periodically. Also, as mentioned previously, the wheel becomes smaller with use, and must therefore be periodically replaced before the lens size increases beyond a tolerable limit. Each time the grinding wheel is either dressed or replaced, the edging machine is idle and non-productive.

The inability of such lens grinding machines to consistently produce lenses of the same dimensions arises from the fact that each lens is formed in the same machine at different times in the life of the grinding wheel, the cam and other wearing surfaces of the machine. Alternatively, the same components of different edging machines are at different points of wear so that lenses made on different machines are necessarily of slightly different dimensions. Such inconsistencies create difficulties when attempting to mount lenses into frames.

Another problem is that the rate at which the lens edge is ground must be slow enough to avoid damaging the glass lens material. If in an attempt to boost productivity the grinding wheel speed and/or the lens rotation speed is increased to the point at which sparking is observed during the edge grinding process, the glass material is damaged and rendered useless for high-quality eye-wear. Even if sparking or combustion of small glass particles is not observed, the lens surface may be too rough to be acceptable as a result of grinding the edge too fast. For these reasons, the rate at which the lens is ground is necessarily slow in order to avoid any risk of damaging the glass lens material. The disadvantage is that the slow production rate drives up the cost of producing lenses.

Computers have been employed to assist the lens edging process, as disclosed in the above-referenced patent to Ramos et al. Specifically, a computer is used to position the lens edge directly over the beveling groove in the Ramos et al. grinding wheel in accordance with the lens size, different sized lenses requiring different positions relative to the groove. Also, the computer in the Ramos et al. patent controls the sequencing of operations.

DISCLOSURE OF THE INVENTION

The invention is a pre-programmable lens edging machine system which grinds and bevels the lens edge under the control of a microprocessor responding to a lens edge shape programmed into memory. The system holds the lens blank by a robot-like arm controlled by the microprocessor. The rotation of the lens by the arm as well as the motion of the arm with respect to the grinding wheel determines the lens shape and size in accordance with the lens edge shape programmed into memory. The lens edge shape and size are easily changed by simply directing the microprocessor to a different lens edge shape in the memory, thus saving the time required to replace the cam in the prior lens edging machines.

The system includes a lens size sensor in a self-corrective feedback loop through the microprocessor which automatically compensates for wear shrinkage of the grinding wheel. The self-corrective feedback loop permits the machine to use the same grinding wheel and wear it down almost to a nub without suffering appreciable change in lens size, depending upon the frequency at which the lens size is monitored.

The invention also includes a method for distributing wear across at least nearly the entire surface of the grinding wheel, whereby the lens blank continually moves axially across the surface of the grinding wheel during substantially the entire lens edge grinding operation so as to uniformly distribute wear across the surface of the grinding wheel. This uniform wear process avoids the formation of voids or grooves in the grinding wheel, which in prior machines have required elimination by dressing the wheel frequently. In the invention, by virtue of the self-correcting feedback loop the wheel does not need to be changed until it has been completely worn away, and by virtue of the uniform wear process need not be dressed, thus eliminating the frequent interruptions required by frequent attention to maintenance of the grinding wheel in prior lens edging machines.

In accordance with one aspect of the invention, after the lens edge shape has been formed by grinding on a cylindrical portion of the grinding wheel, the lens edge is beveled on a convex apex portion of the grinding wheel by successively rotating opposite sides of the lens edge against opposite sides of the grinding wheel apex. In this aspect of the invention, the rotational motion of the lens as well as the motion of the robot-like arm holding the lens is governed by the microprocessor in accordance with a trajectory stored in memory computed in accordance with the shape and curvature of the lens and the shape of the grinding wheel apex. As used in this specification, the term "trajectory" refers to the simultaneous paths of (a) the rotation of the lens about a fixed center point on the lens, (b) the radial motion of the lens perpendicular to the rotational axis of the grinding wheel and (c) the transversal motion of the lens parallel to the rotational axis of the grinding wheel. Different beveling geometries may be programmed into memory for the same type of lens and the same beveling geometry may be programmed into memory for many different lenses.

In accordance with the invention, the motion of the lens or lens blank is divided into N points in time covering the entire lens edge grinding and beveling process, where N is on the order of 64,000, for example. The rate at which the lens is rotated against the grinding wheel, the rotational speed of the wheel, the velocity at which the lens is translated axially across the surface of the grinding wheel and the force with which the lens is held against the grinding wheel are each defined in memory for each one of the N points. The microprocessor requires a complete set of such definitions stored in memory for each different lens shape to be made.

In yet another aspect of the invention, the set of definitions of the lens rotational rate, the grinding wheel speed, the axial lens feed velocity and the grinding pressure are optimized at each one of the N points to maximize lens grinding speed (productivity) to a rate slightly below that which would overheat the glass lens material. The optimum value for each parameter (rotational rate, speed, feed velocity and grinding pressure) is determined at each one of the N points in accordance with a trial and error method of the invention in which various combinations of all the parameters are tried at each one of the N points and the results stored in memory. In one embodiment of this method, the microprocessor systematically varies all the parameters (rate, speed, velocity and pressure) while monitoring a spark sensor positioned to detect overheating of the glass lens material. For each one of the N points in the motion of the lens, the microprocessor notes the value of all the parameters at the highest grinding wheel speed at which no overheating was detected by the sensor. The microprocessor stores the noted values in memory. After this process has been carried out at all N points, the trial and error process is complete, and the memory contains a set of optimum grinding parameters for the entire grinding process of a given lens shape. This set of parameters is then permanently stored (on hard disk or in read-only memory, for example) and reused over and over during the manufacture of lenses of the same design. The learning process merely requires a memory of sufficient capacity.

The optimum speed at which the glass is removed from the lens is determined at least in part by the ability of the removed glass particles to take away heat from the workpiece or lens blank. In order to maintain a certain rate of heat removal, rate of glass removal should be prevented from decreasing as the size of the workpiece (the lens blank) decreases during the grinding process. Thus, the trial and error learning method of the invention in many cases may progressively increase the grinding wheel speed as the size of the lens blank decreases during the grinding process. In this sense, the set of optimum grinding parameters generated by the trial and error learning method of the invention will implement well-known principles of metal lathe techniques sometimes referred to as "constant surfacing".

BRIEF DESCRIPTION OF THE DRAWINGS

Preferred embodiments of the invention are described below in detail by reference to the accompanying drawings, of which:

FIGS. 2a and 2b illustrate, respectively, a lens blank and a lens produced from the blank by the apparatus of FIG. 1a;

MODES FOR CARRYING OUT THE INVENTION

Conventional Lens Edging Techniques

Figure 1B:
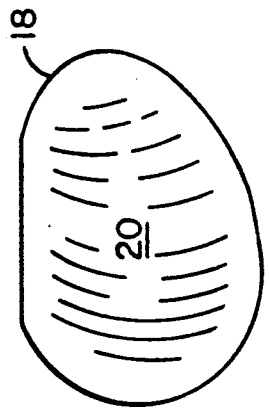
FIGS. 1a and 1b illustrate apparatus of the prior art for grinding lens edges.
Figure 1A:
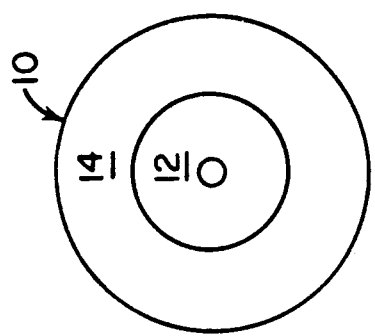

FIG. 1a illustrates the basic steps in a lens edging process of the prior art. A grinding wheel 10 includes a cylinder portion 12 and an apex portion 14, both portions having concentric circular shapes as shown in FIG. 1b. The grinding wheel 10 is made of a diamond-like material. A lens blank 18 shown in FIG. 2a is ground along its edge 18 on the cylindrical portion 12 of FIG. 1a to form the lens 20 of FIG. 2b. The "left" corner 18a of the lens edge 18 is then ground on the "right" side 14a of the apex portion 14 and the "right" corner 18b of the lens edge 18 is ground on the "left" side 14b of the apex portion 14 to form beveled lens edge surfaces 22a and 22b, respectively. The geometry of the beveled surfaces 22a and 22b conforms to the design of the eye wear frame in which the lens 20 is to be mounted.

Figure 2B:
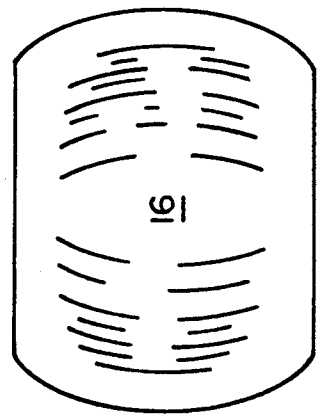
Figure 2A:
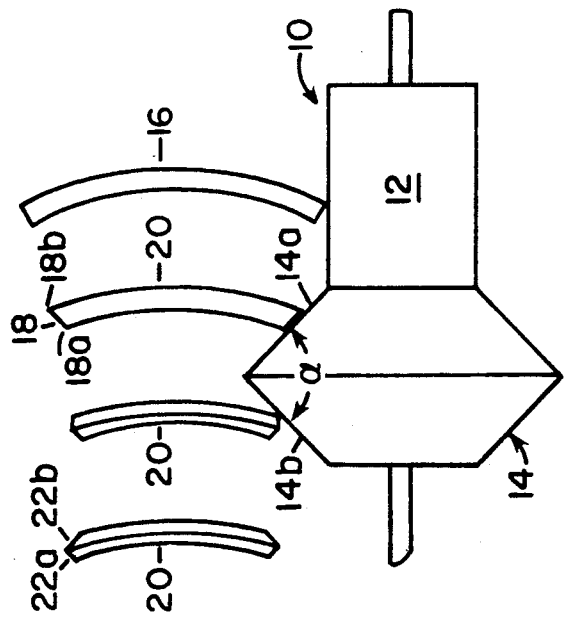

The motion of the lens during the grinding process is governed by the motion of a rotating cam (not shown) against a stationary surface, the cam having the same shape as that of the lens 20 illustrated in FIG. 2b. The method and apparatus of the prior art suffered from a number of disadvantages as discussed previously herein, arising from the wearing away of the surface of the grinding wheel 10, the wearing away of the surface of the cam and the formation of voids in the surface of the grinding wheel 10 due to non-uniform wear, as well as the necessity of changing the cam each time a different lens design was to be followed.

The System of the Invention

Figure 3:
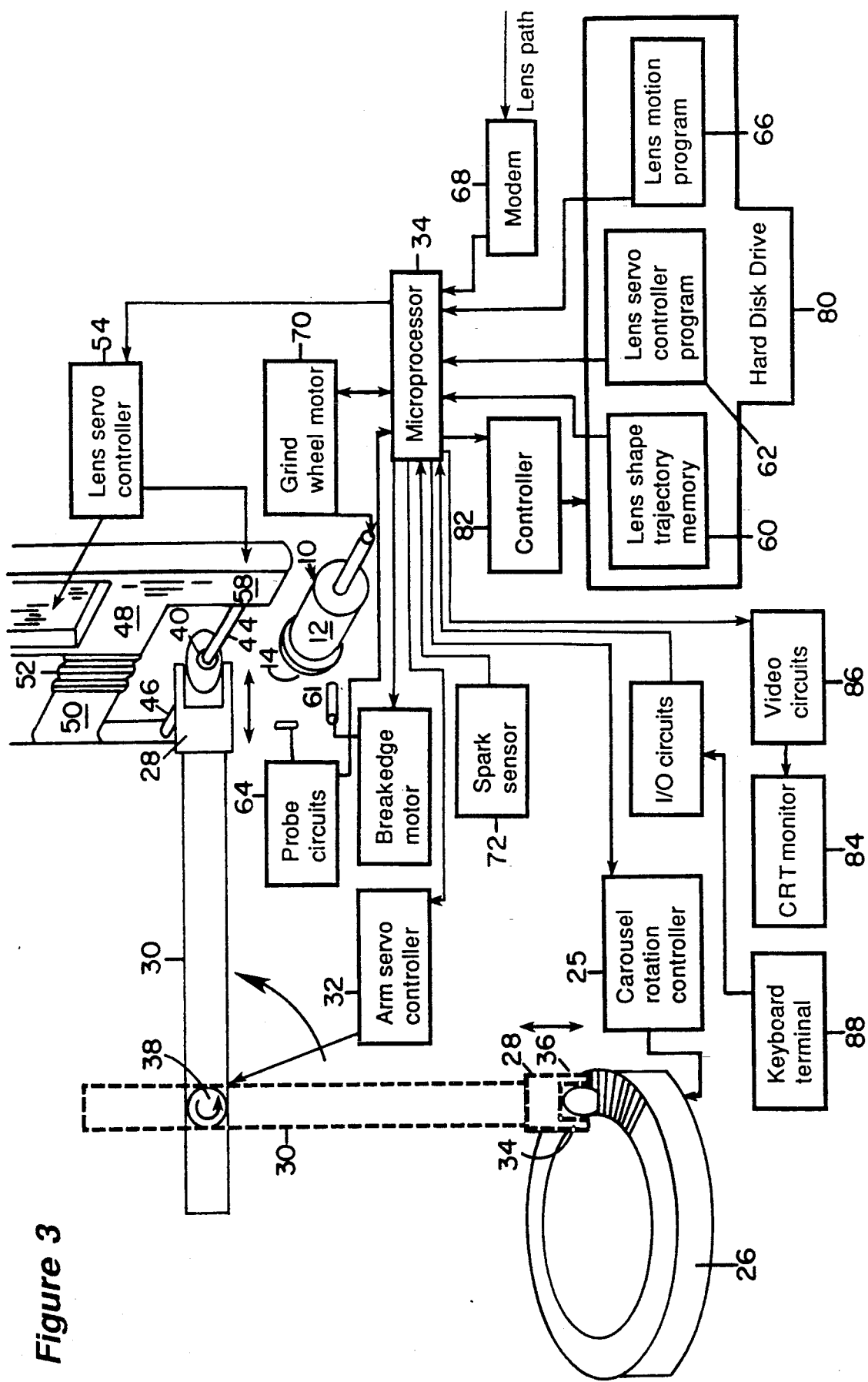
FIG. 3 is a simplified pictorial diagram illustrating key components of the lens edging system of the invention.
Figure 4:
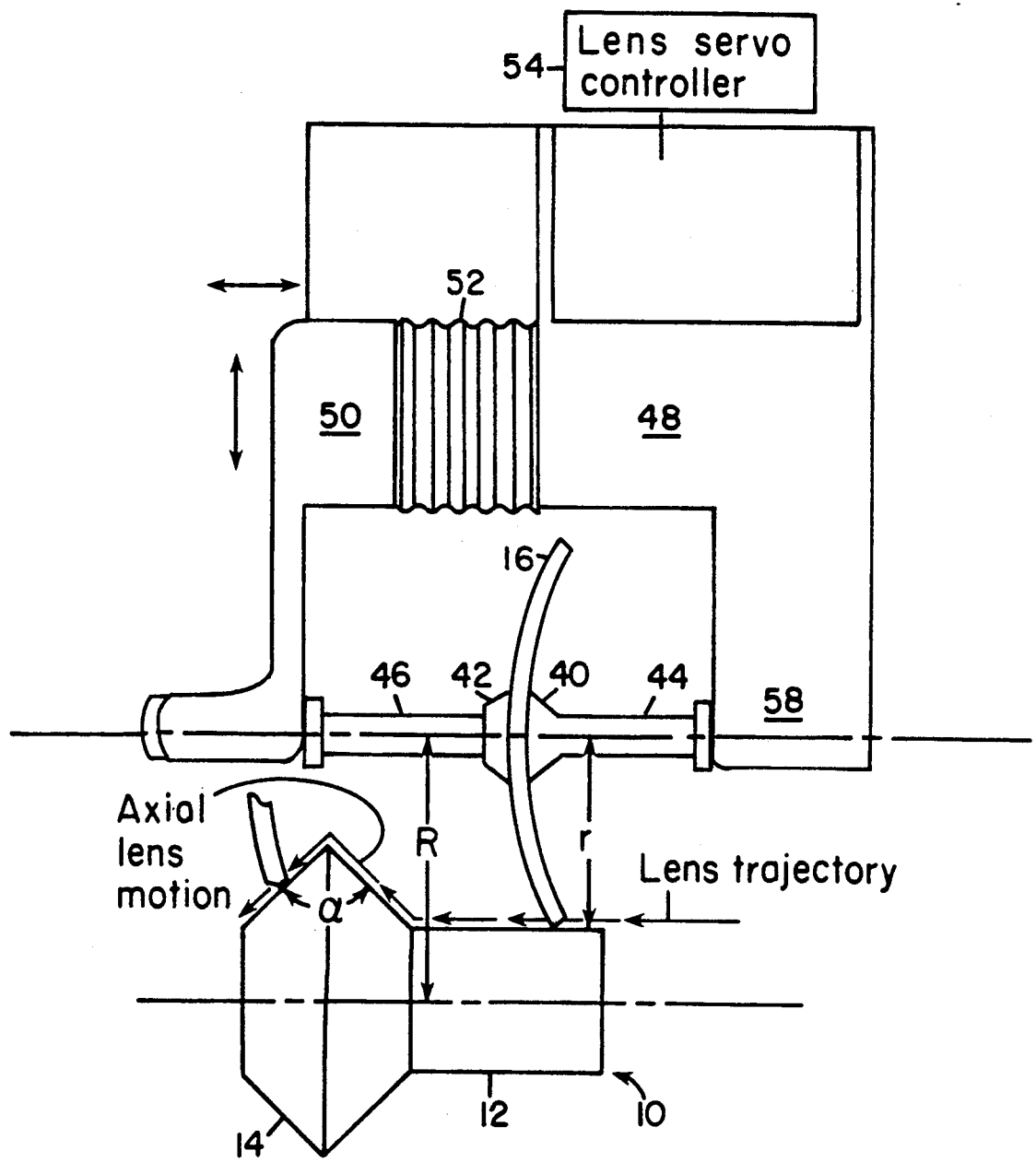
FIG. 4 is a diagram illustrating the lens servo arm employed in the system of FIG. 3.

All of these problems are solved in the lens edging system of the invention illustrated in FIG. 3. Each lens blank is withdrawn from a carousel 26 containing many lens blanks by a servo-controlled hand 28 mounted on a servo-controlled arm 30 governed by an arm servo controller 32 controlled by a central microprocessor 34. The position of the rotating carousel 26 is controlled by the microprocessor 34 through a carousel rotation controller 25 using well-known digital servo control techniques. In one implementation, the hand 28 moves axially along the arm 30 so that it extends itself toward the carousel 26 (dashed-line position) and grabs the lens blank 16 by pressing opposing edges thereof between two fingers 34, 36. The finger 36 is movable toward the other finger 34 to clasp the lens 16 firmly. The hand 28 then withdraws up the arm 30 and the arm 30 rotates about a pivot 38 to the solid line position. The hand 28 then moves axially along the arm 30 to insert the lens between opposing driver cups 40, 42 (FIG. 4) mounted on rotating spindles 44, 46. The spindles 44, 46 are supported on opposing spars 48, 50 of a lens servo arm 52 governed by a lens servo controller 54 under control of the microprocessor 34. As soon as the lens blank 16 is positioned between the pair of driver cups 40 and 42, the lens servo controller 54 causes the opposing spars 48, 50 to travel toward one another to grasp the lens blank 16 between the two driver cups 40, 42, as shown in FIG. 4. The microprocessor 34 then commands the lens servo controller 54 to move the arm 52 toward the grinding wheel 10 and hold the edge of the lens blank 16 against the wheel 10 and to rotate the spindles 44, 46 by means of a spindle motor 58 controlled by the lens servo controller 54.

The lens servo controller 54 varies the distance R of the center of the lens blank 16 (i.e., the axis of the spindles 44, 46) from the axis of the grinding wheel 10 as the lens blank rotates about the axis of the spindles 44, 46 so as to achieve the desired lens edge contour or shape. The lens servo controller 54 does this under control of the microprocessor 34 in accordance with a lens trajectory table stored in a lens shape trajectory memory 60. The lens trajectory table defines the distance r between the lens blank center and the grinding wheel 10 for each incremental rotational position 8 of the lens blank 16 about the axis of the spindles 44, 46 in accordance with the shape of the lens to be formed. Using well-known computer numerical machine control techniques of the prior art, the microprocessor 34 computes from the data stored in the lens shape trajectory memory 60 servo control signals using a servo controller program stored in a lens servo controller program memory 62. Generating the servo controller program is conventional in the art. The microprocessor 34 transmits the control signals thus generated in a succession which determines the sequence of the lens edge grinding steps.

Upon completion of the lens edging process, the lens edge is smoothed by the lens servo arm holding the corner 18a of the lens edge 18 against a rotating break-edge wheel 61.

The lens shape trajectory memory 60 may contain a large selection of different trajectory tables for manufacturing different lenses with different edge contours. Thus, the lens design may be quickly changed by directing the microprocessor 34 to a different table in the memory 60, a significant advantage.

Self-Correcting Lens Dimension Feedback Control Loop

As the grinding wheel 10 wears, it gets smaller, which increases the size of the lens in prior art techniques. The solution has been to frequently replace the grinding wheel 10 to minimize the growth in lens size as successive lenses are edged. This problem is solved in the present invention by using a size probe 64 connected through probe output circuits 66 to the microprocessor 34. The probe 64 is of the type manufactured by, for example, Renishaw Metrology Ltd., Gloucester, England. After the lens 20 has been formed by the system of FIG. 3, the lens servo arm 52 rotates the lens to a predetermined rotational position 8 and then moves the lens 20 edgewise toward the probe 64. The microprocessor 34 notes the position of the lens servo arm 52 at the point when the probe 64 first senses contact with the lens edge. This position indicates the radius r of the lens 20 at the rotational position 8. The correct position may be readily determined from the desired lens edge contour. The microprocessor 34 compares the actual position and the correct position to compute an error. The microprocessor 34 compensates for this error by adjusting (decreasing) the distance between the next lens to be edged and the axis of the grinding wheel 10. Essentially, the microprocessor 34 adjusts the trajectory of the lens for the entire edging process to bring it closer to the rotational axis of the wheel 10 by an amount equal to the computed position error. This feature will be described below herein. Thus, the grinding wheel 10 may be allowed to wear down almost to its axle during the edging of successive lenses without creating errors in lens dimensions as long as the lens radius is monitored sufficiently frequently.

Uniform Distribution of Wheel Wear

Another problem of the prior art was that most of the lens edging took place on the cylinder portion 12 of the grinding wheel 10, with non-uniform wear creating voids or unwanted grooves in the grinding wheel. Thus, the wheel 10 had to be dressed frequently. The invention includes a method for solving this problem in which the microprocessor 34 causes the lens servo arm 52 to continuously translate the lens blank 16 axially across the surface of the grinding wheel 10 during the entire lens edging operation while controlling the axial feed velocity of the lens from one end of the wheel 10 to the other end to uniformly distribute the wear across the entire surface of the wheel 10. This axial motion continues during the beveling operation when the lens contacts the apex portion 14 of the grinding wheel 10.

In accordance with the uniform wear distribution method of the invention, the lens servo arm 52 must perform a complex task by rotating the lens blank 16 while varying its displacement from the grinding wheel 10 in accordance with the desired lens shape while at the same time translating the lens axially across the surface of the wheel 10 in a continuous motion. This task is even more complex as the lens is beveled on the apex portion 14 of the wheel 10, as will be discussed below herein.

Dual Lens Dual Load/Unload Magazine Method

Figure 5A:
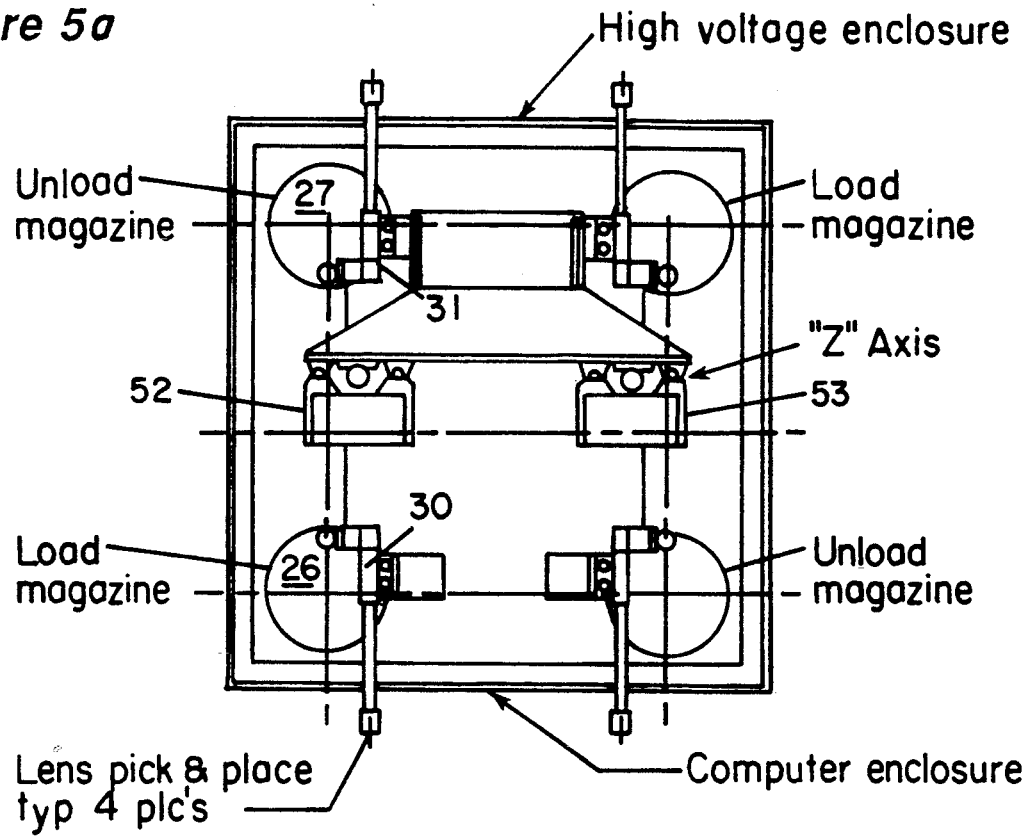
FIGS. 5a and 5b illustrate a complete version of the system of FIG. 3.
Figure 5B:
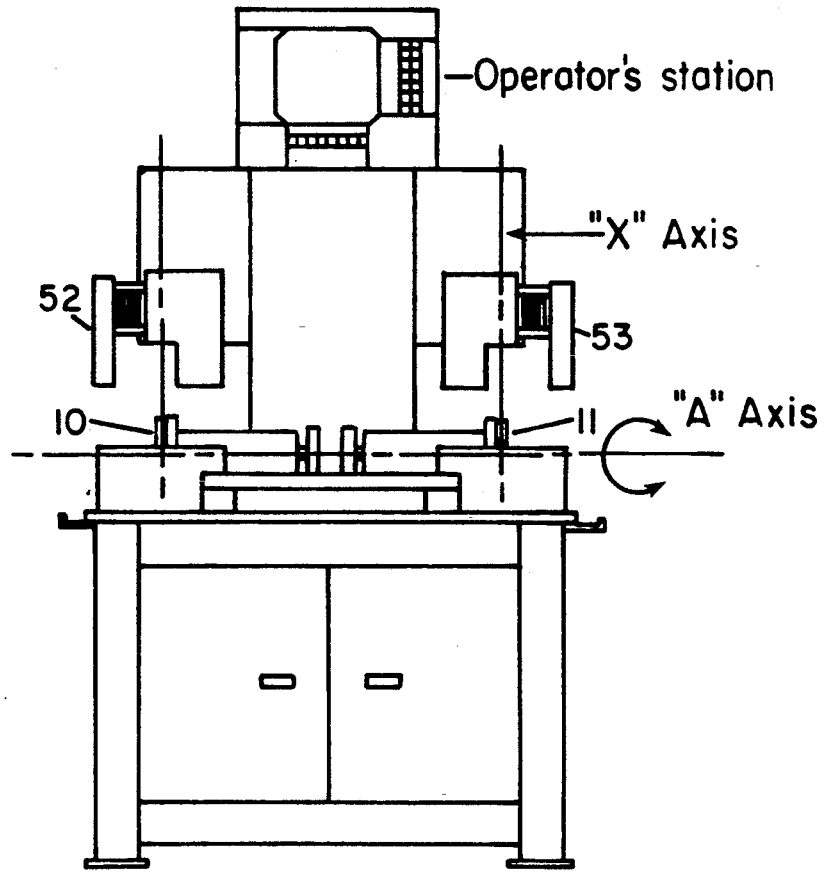

Referring to FIG. 5, the preferred method of the invention requires the same microprocessor 34 to control the simultaneous grinding of a pair of lenses by a pair of grinding wheels 10, 11 using a pair of lens servo arms 52, 53. For each one of the two grinding wheels 10, 11, there is an unload arm 30 (as in FIG. 3) and a load arm 31, an unload carousel 26 (as in FIG. 3) and a load carousel 27. With respect to the one lens servo arm 52, the unload arm 30 picks a lens blank out of the unload carousel 26 and gives it to the lens servo arm 52 for edging. At the conclusion of the edging process, the load arm 31 takes the lens from the lens servo arm 52 and places it in the load carousel 27. Each carousel is rotated to position the present the next slot in the carousel to the corresponding load or unload arm for the next cycle. Preferably, the microprocessor 34 is programmed to operate the carousels and the load and unload arms so that as one finished lens is being placed into the unload carousel, the next lens blank is being taken from the load carousel, so that there is no wasted motion. One advantage is that the same cycle may be used to simultaneously produce a pair of lenses to be inserted into the same eye wear frame, so as to enhance the probability that each pair of lenses is closely matched.

Programmable Lens Edging and Beveling Method

Figures 6, 7:
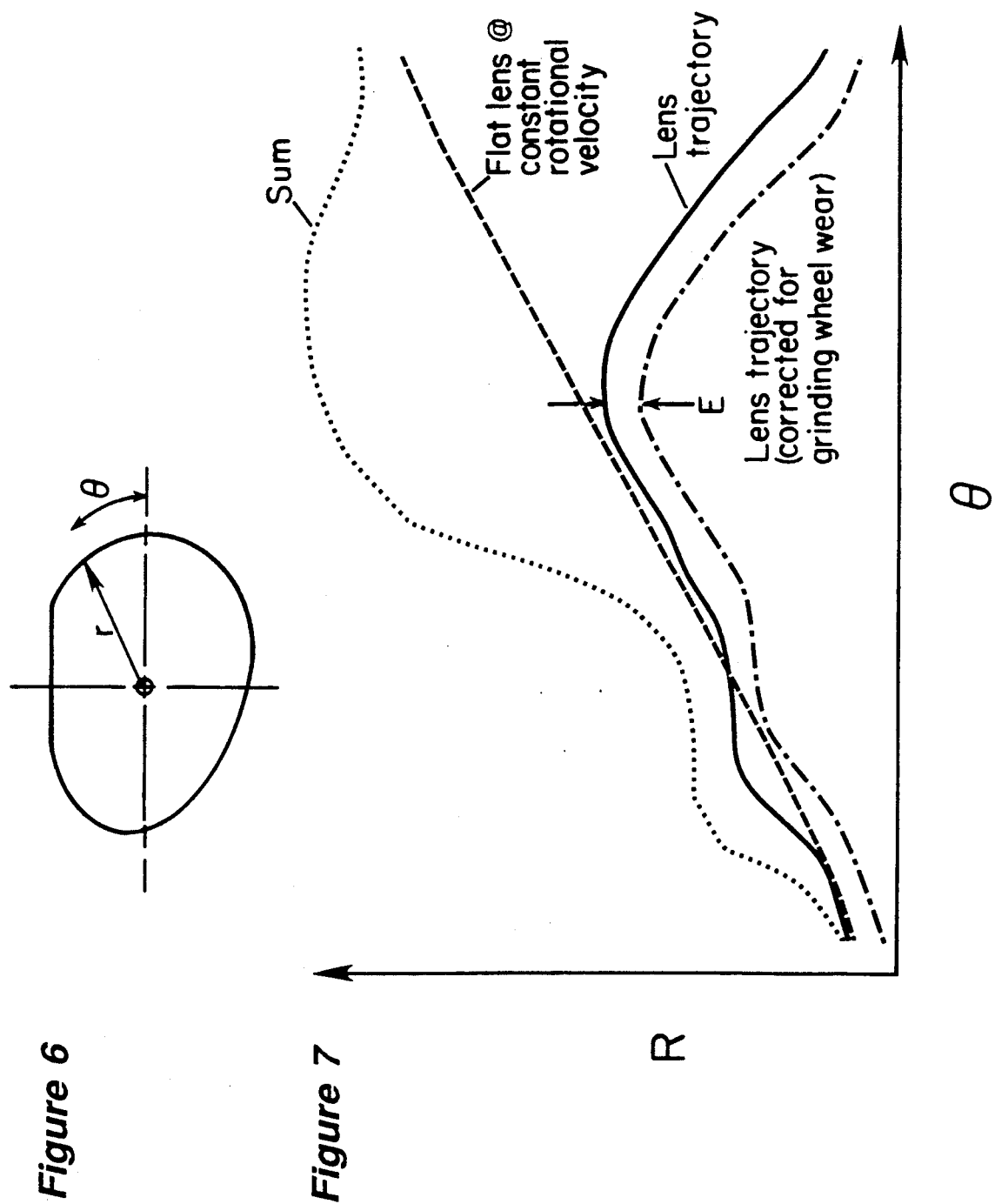
FIG. 6 is a polar plot of an exemplary lens ege contour.
FIG. 7 depicts a plot of the lens trajectory during edging on a cylindrical portion of the grinding wheel (solid line) and on an apex portion of the grinding wheel (dotted line) for a lens with no curvature and a constant lens rotational rate.

FIG. 6 illustrates an exemplary lens edge shape in polar coordinates. The radius r in FIG. 6 corresponds to the distance r in FIG. 4 between the center of the lens 20 (the axis of the spindles 44, 46) and the surface of the grinding wheel 10. As defined herein, the center of the lens is the point around which the lens 20 rotates during the edging process. The distance R in FIG. 4 is the displacement between the center of the lens and the center of the grinding wheel 10. The difference between r and R is the radius of the grinding wheel 10. The solid line curve of FIG. 7 is a graph of R as a function of the lens rotation angle Θ corresponding to the polar coordinate plot of FIG. 6. The solid line curve is the trajectory defined in the data stored in the lens trajectory memory 60 governing the motion of the lens blank 16 over the cylindrical portion 14 (only) of the grinding wheel 10.

Uniform Wear Distribution During Lens Beveling

The trajectory of the lens 20 during the beveling operation is more complex and depends upon the slope of the apex portion 14 of the grinding wheel 10 as well as the curvature of the lens 20 itself. Assuming that the lens shape depicted in the polar plot of FIG. 6 has no curvature—is perfectly flat—the lens trajectory during the beveling operation may be obtained by superimposing the dashed sloped line of FIG. 7 onto the solid line curve and adding the two together. The resulting complex lens trajectory (dotted line) describes the lens trajectory relative to the grinding wheel 10 during beveling as the lens is translated axially across the surface of the apex portion 14 at a constant speed in accordance with the method of the invention for uniformly distributing wear across the entire surface of the grinding wheel 10. The dotted line curve describes that portion of the lens trajectory in which the lens climbs up one side of the apex 14 and then descends down the other side so as to uniformly distribute wear across the surface of the apex portion 14. Thus, the dotted line curve of FIG. 7 corresponds to the data stored in the memory 60 for the beveling portion of the lens edging process.

Figure 8:
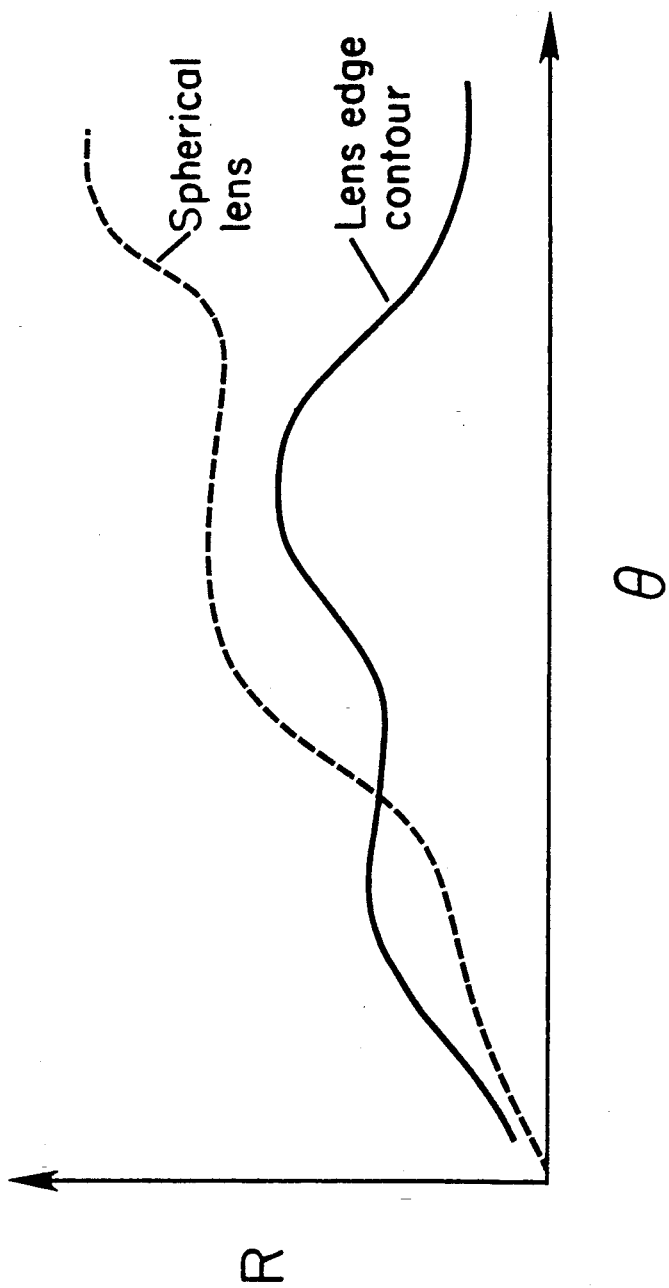
FIG. 8 depicts a plot of the lens trajectory corresponding to FIG. 7 for a lens having a spherical curvature.

In most cases, however, the lens trajectory is even more complex during beveling because the lens typically has a spherical curvature (as depicted in the side view of the lens 20 in FIG. 1a). This complex lens trajectory may be obtained in the graph of FIG. 8 by summing the solid line curve defining the lens edge shape and the non-linear dashed line curve. The shape of the nonlinear dashed line curve of FIG. 8 is dictated by the curvature of the lens and the included angle α of the apex portion 14 of the grinding wheel 10. Unlike FIG. 7, the resulting lens trajectory during beveling is not illustrated for the more complex case of FIG. 8, but is theoretically obtained by adding the two curves of FIG. 8 together. By varying the distance R between the lens 20 and the center of the apex 14, the depth to which the lens edge is beveled may be varied as desired.

A more practical method for obtaining the lens trajectory during beveling is to calculate it using spherical trigonometry, in accordance with well-known principles. A computer program for doing this is attached hereto as Appendix A. Such a computer program can be performed by the microprocessor 34 and may be stored in a lens motion program memory 64. Such a program merely requires the user to input the lens design data including the lens shape (as represented by the polar plot of FIG. 6), the lens curvature (visible in the side view of the lens of FIG. 1a for example) and the included angle o of the apex portion 14 of the grinding wheel 10. Such input data may be stored or entered at a peripheral device 66 illustrated in FIG. 3. The peripheral device may be a memory or a communication device such as a modem. Thus, a new lens design may be input from a distant remote location via modem (68) and the entire lens motion quickly and automatically calculated by the microprocessor 34 using the lens motion program in the memory 66. The resulting lens trajectory table is stored by the microprocessor 34 in the memory 60 along with corresponding tables for other lens designs. The entire procedure of changing or updating lens designs requires virtually no human presence at the system of FIG. 3, a significant advantage.

How the Self-Correcting Feedback Loop Changes the Lens Trajectory as the Grinding Wheel Wears Down The difference between R and r is the radius of the grinding wheel 10, which decreases as the wheel wears down. As described previously herein, the selfcorrecting feedback method performed by the microprocessor 34 periodically compares the ideal lens some predetermined lens rotation angle $\theta$ against the correct radius at that angle as determined from the graph of FIG. 6. Any difference indicates the amount by which the grinding wheel radius has decreased from wear. The microprocessor 34 simply changes the trajectory by subtracting from all values of R in the graph of FIG. 7 (for example) the detected difference between the actual and ideal lens radius at some predetermined angle $\theta$.

The result is illustrated by the dash-dotted line of FIG. 7. The displacement E between the solid line and the dash-dotted line in FIG. 7 is the error or difference detected by the microprocessor 34 between the ideal and actual lens radii. Thus, as the grinding wheel radius decreases, the microprocessor 34 maintains the lens radius r as a function of lens rotation angle $\theta$ at the correct value by decreasing R as necessary.

Nature of the Lens Shape Trajectory Memory 60

All parameters governing the lens edging process are defined in a table stored in the memory 60. Already discussed herein are the lens shaping parameters r and $\theta$ as well as the continuous axial feed velocity required by the uniform wear distribution method of the invention. Remaining parameters include the rotational rate of the lens ($d\theta/dt$), the grinding wheel speed and the force with which the lens edge is pressed against the wheel.

Figure 9A:
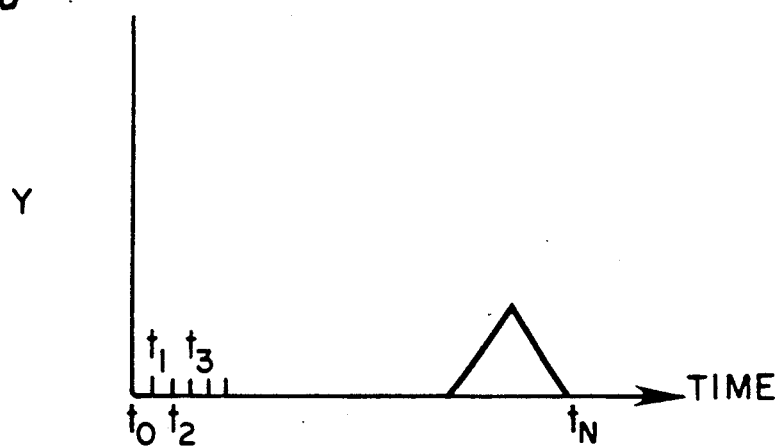
FIGS. 9a, 9b and 9c are exemplary lens trajectory plots depicting the vertical position, horizontal position and horizontal (feed) velocity, respectively, of the lens motion relative to the grinding wheel as a function of time.
Figure 9B:
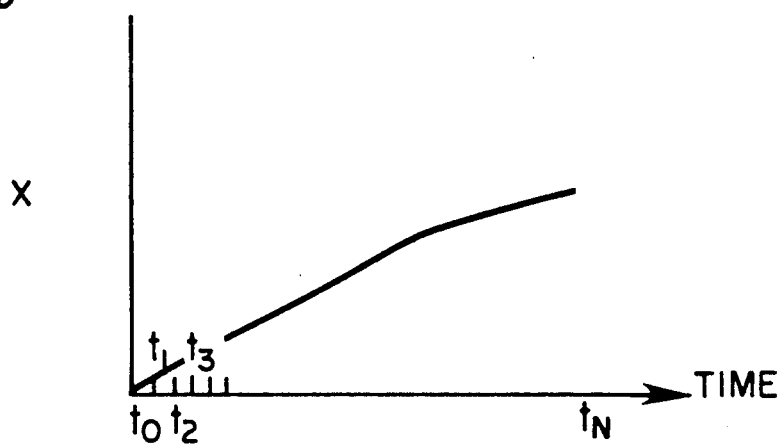
Figure 9C:
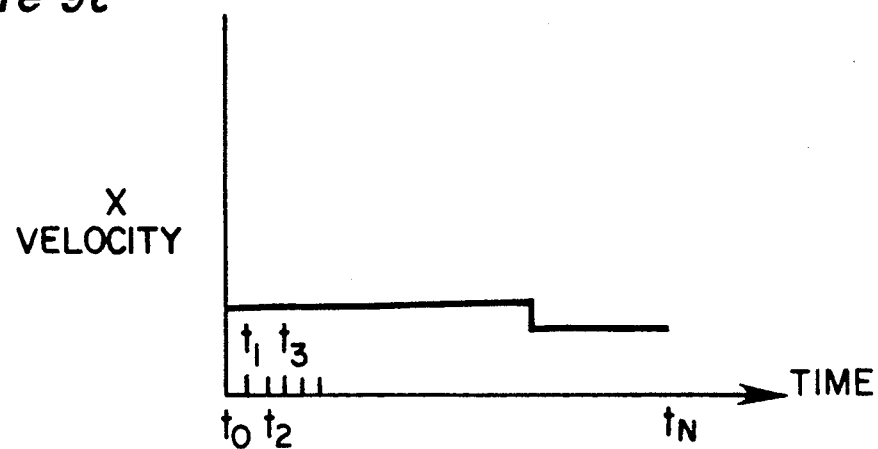

To implement discrete control by the microprocessor 34, the motion of the lens, as defined by the vector $(r,\theta)$, is divided into N discrete segments. In the following example, N=64,000, although it should be recognized that the skilled worker may choose any suitable value for N. These segments may be thought of as N points in time $t_0, t_1, t_2, \ldots, t_N$ covering the entire duration of the edging process. The displacement Y of the center of the lens from the axis of the wheel 10 as a function of time is illustrated in FIG. 9a. The triangular hump in FIG. 9a corresponds to the beveling portion of the process. FIG. 9b is contemporary with FIG. 9a and illustrates the position X of the center of the lens along the axis of the grinding wheel as a function of time. In the tutorial example of FIG. 9b, the feed velocity (dX/dt) of the lens is smaller during the beveling portion of the process. This is illustrated in FIG. 9c. However, it should be understood that any sequence or variation of feed velocities is possible.

FIG.'S 9a, 9b and 9c correspond to the lens trajectory indicated in FIG. 4 in which the lens blank 16 constantly travels axially across the grinding wheel 10. All of the parameters mentioned previously may be plotted in like fashion. Such plots are divided into N points (in the manner of FIG.'S 9a, 9b and 9c) and digitized to represent the data stored in the memory 60.

Figure 10:
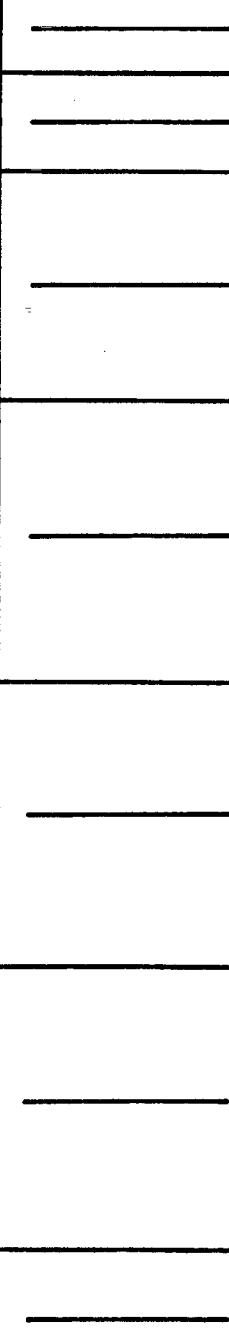
FIG. 10 depicts a table stored in a memory of the system of FIG. 3 of all the parameters of the grinding process for each incremental point in time during the lens edging process.

FIG. 10 illustrates the format of the data stored in the memory 60 in a table. At each one of the 64,000 points into which the process has been divided (labelled $t_0, t_1, t_2$, etc.) the table of FIG. 10 defines the lens axial feed velocity, the wheel speed, the lens rotational rate, the grinding force, the displacement r and the lens rotation angle $\theta$. At each point $t_i$ of the process, the microprocessor 34 fetches from the table of FIG. 10 (stored in the memory 60) the corresponding value for each one of the foregoing parameters and determines therefrom any changes in the servo control signals it sends to the lens servo controller 54, the grinding wheel motor 70 and the lens rotation motor 58. The lens servo controller 54, by governing the motion of the lens servo arm 52, controls the rate of axial translation of the lens along the axis of the wheel 10, the rotation of the lens as well as the distance r of the center of the lens from the surface of the grinding wheel 10.

The skilled worker may devise various practical embodiments of the table of FIG. 10, in which some of the foregoing parameters are eliminated as redundant or unnecessary, a mentioned previously. For example, specifying the lens rotation angle $\theta$ at each of the N points in time may obviate the need to specify the lens rotation rate $d\theta/dt$ at each of the N points.

Trial and Error Programmed Learning Process

There is no known method for computing the optimum values for all of the foregoing parameters at each of the N=64,000 points into which the lens edging process has been divided in the table of FIG. 10. In accordance with the invention, the "optimum" set of values for all parameters at each one of the N points is defined as that set which results in the greatest productivity without harm to the glass lens material. Such harm is evidenced by visible sparking (combustion of glass particles) during edging or poor surface finish on the lens edge following the edging process.

Figure 11:
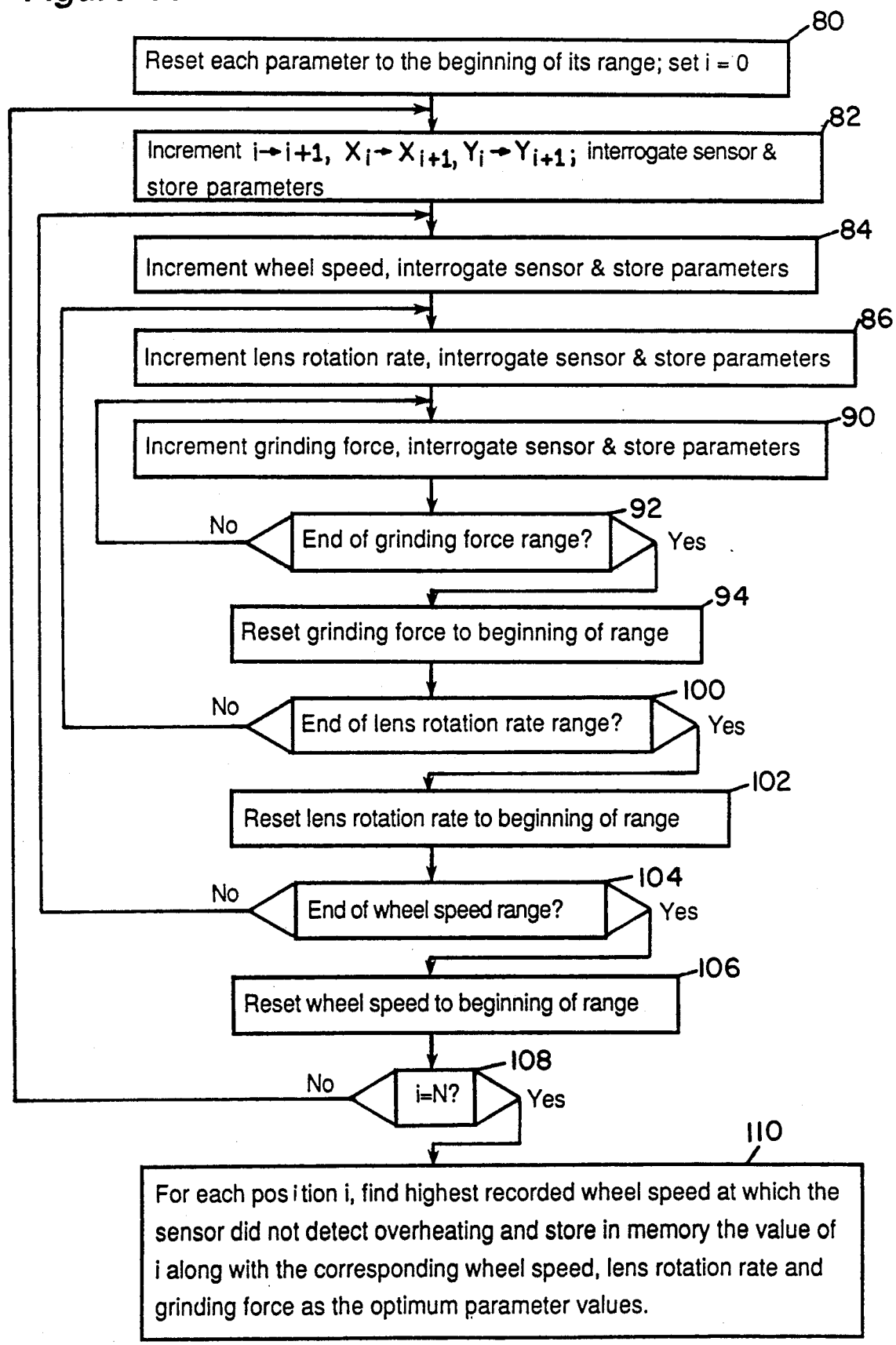
FIG. 11 is a flow diagram illustrating the programmed learning process of the invention for learning the optimum values of the parameters to be written into the table of FIG. 10.

The method of the invention for programming the memory 60 and operating the system of FIG. 3 with the optimum values of the parameters of the table of FIG. 10 begins with the preparatory learning steps illustrated in the flow diagram of FIG. 11. Essentially, the parameters are all varied at each one of the N points into which the process has been divided in the table of FIG. 10 and the combination of parameter values having the highest glass lens material removal rate by the grinding wheel without evidence of harm to the material is selected as the optimum set for that point in the process. This task is performed N times to find the optimum combination of parameter values at each one of the N points.

In the embodiment of FIG. 11, this method employs a spark sensor 72 (such as an infrared sensor) illustrated in FIG. 3 positioned to sense any sparking of glass particles removed by the grinding wheel 10 from the lens blank 16. The microprocessor 34 causes the system to automatically and systematically step through all possible combinations of all the parameters of the table of FIG. 10 at each one of the N points in the lens edging process (blocks 80 through 108 of FIG. 11). For each combination of parameter values, the microprocessor 34 interrogates the spark sensor 72 to determine whether that combination is permissible. After all the data has been stored, the microprocessor 34 finds the highest permissible grinding wheel speed and stores it along with the values of the other parameters stored concurrently in the table of FIG. 10 in the memory 60 (block 110 of FIG. 11). The microprocessor 34 thus fills all entries in the table of FIG. 10 by performing the foregoing task for each one of the N points into which the lens edging and beveling process has been divided.

In the simplified example of FIG. 11, for the sake of tutorial clarity it is assumed that the linear feed velocity at which the lens blank 16 is translated axially across the surface of the grinding wheel 10 is constant during the entire edging process and is reduced to another smaller constant velocity during the beveling process. However, it should be recognized that this simplification is not necessary and in many will not be used in carrying out the invention. With this simplification, each point in time $t_i$ is easily associated with a certain $X_i, Y_i$ location of the lens blank 16 in accordance with the plots of FIG.'S 9a and 9b. A realistic range for each of the parameters of the table of FIG. 10 (grinding wheel speed, etc.) is chosen.

The learning process begins by setting each of the parameters to the beginning of its range and initializing the index i to zero (block 80 of FIG. 11). The $X_i, Y_i$ position of the lens blank 16 is then incremented to the next $(i+1^{st})$ position and the microprocessor 34 interrogates the spark sensor 72 and stores the current value of all the parameters of the table of FIG. 10 if the spark sensor 72 does not detect overheating of the glass lens material (block 82 of FIG. 11). The wheel speed is then incremented and the microprocessor 34 repeats the same interrogation and storing task as before (block 84). Next, the lens rotation rate is incremented and the microprocessor 34 repeats the same interrogation and storing tasks as before (block 86). Then the grinding force is incremented and the microprocessor 34 repeats the same interrogation and storing tasks as before (block 90).

The step of block 90 is successively repeated in an inner loop until the grinding force reaches the end of its range (block 92) at which point it is reset to the beginning of its range (block 94). Then, the step of block 86 is successively repeated in an outer loop, each such repetition including a complete cycling of the inner loop until the lens rotation rate reaches the end of its range (block 100) at which point it is reset to the beginning of its range (block 102). Next, the step of block 84 is successively repeated, each such repetition including complete cycling of the inner and outer loops in the manner previously described until the wheel speed reaches the end of its range (block 104) at which point it is reset to the beginning of its range (block 106).

If the lens blank has not reach the end of its travel (block 108), the process returns to step of block 82 and repeats itself. Otherwise (YES branch of block 108), the microprocessor 34 begins analyzing the data stored in the previous steps (block 110). In the step of block 110, the microprocessor 34 reviews all of the combinations of parameters recorded for each one of the N locations $X_i, Y_i$ in the trajectory of the lens blank 16. At each location, the microprocessor determines which combination had the highest grinding wheel speed, and records that combination (only) in the table of FIG. 10 at the corresponding value of $t_i$.

The flow diagram of FIG. 11 illustrates one of many possible trial and error learning processes which may be implemented in accordance with the invention. In the process of FIG. 11, the optimum combination of parameter values is defined simply in terms of the greatest grinding wheel speed and a spark sensor is employed. Alternatively, another definition of the optimum combination of parameter values may be employed. As another alternative, a measurement of the surface finish may be substituted instead of the spark sensor 72. Of course, some of the foregoing parameters may be eliminated or other equivalent parameters substituted therefore.

One advantage of the programmed learning process of FIG. 11 is that increasing the rate at which the grinding wheel 10 removes material from the glass lens blank 16 increases the rate at which heat is removed from the blank 16, so that the optimum upper limit for grinding speed may be much higher than expected. Generally, however, acceptable results characterized by an RMS surface finish of the lens edge of between 32 and 250 is achieved by grinding wheel speeds in the neighborhood of 2,500 RPM, a lens rotation rate of 20 RPM and an axial lens feed rate of 30 inches/minute. Preferably, the included angle of the apex portion 14 of the wheel 10 is 113°.

Preferably, the microprocessor 34 is part of an AT computer system of the well-known type in which the microprocessor controls a 20 mega-byte hard disk memory 80 through a disk drive controller 82 and controls a monitor 84 through a video controller 86. Commands may be sent to the microprocessor by an AT keyboard terminal 88. The memories 60, 62 and 66 are all individual memory locations in the hard disk memory 80. An operator may use the keyboard terminal 88 to have the microprocessor 34 display on the monitor information regarding the lens edging process performed by the system of FIG. 3. Also, the operator may use the keyboard terminal 88 to begin or interrupt or modify the process, for example to permit new lens design data to be recieved through the modem 68 and stored in the memory 80. The operator may also use the keyboard terminal 88 to command the microprocessor to begin the programmed learning process of FIG. 11. Preferably, the process of FIG. 11 is implemented in a software program stored in the memory 80.

While the invention has been described in detail by specific reference to preferred embodiments thereof, it is understood that variations and modifications may be made without departing from the true spirit and scope of the invention.

What is claimed is:

1. A lens edging system for shaping an optical lens workpiece having a major surface, said major surface having a boundary of an initial contour bounded by a relatively thin edge of said workpiece, by grinding said edge so as to change said boundary of said major surface to a new boundary corresponding to a predetermined contour, said system comprising:

an edging tool;

holding means for holding said lens workpiece relative to an axis at least approximately normal to at least a portion of said major surface;

memory means for storing data representing a lens edge grinding trajectory with respect to said edging tool, said data comprising a succession of lens rotation angles about said axis and a succession of lens radii corresponding to said succession of lens rotation angles, said lens radii defining said new boundary with respect to said axis; servo means for effecting rotation of said lens workpiece relative to said edging tool through servoed lens rotation angles about said axis and motion of the edge of said lens workpiece relative to and toward said edging tool to servoed lens radii;

processor means connected to said memory means for controlling said servo means and for governing said servoed lens radii and said servoed lens rotation angles in accordance with said data, whereby said servoed lens rotation angles correspond to said succession of lens rotation angles stored in said memory and said servoed lens radii correspond to said succession of lens radii stored in said memory, whereby to change the contour of said major surface from said initial contour to said predetermined contour.

2. The system of claim 1 wherein said servo means comprise means for causing said holding means to translate said lens workpiece axially across the surface of said edging tool, said microprocessor means causing said holding means to translate said lens workpiece continuously across said edging tool surface whereby to distribute wear across said edging tool surface, whereby to minimize the frequency with which said edging tool requires dressing.

3. The system of claim 1 further comprising lens size sensor means for measuring a radius of said lens workpiece upon grinding of said edge by said edging tool, whereby said microprocessor means comprises:
means for comparing an actual lens radius sensed by said sensor means with a predetermined value and computing an error therefrom;
means for modifying said succession of lens radii so as to compensate for said error, whereby to permit said edging tool to wear down without causing a corresponding error in the actual lens radius of a succession of lenses edged on said edging tool.

4. The system of claim 1 wherein:
said memory means contains a table defining said lens radii and lens rotation angles at N points along said lens trajectory, said table comprising said lens trajectory data, said table further defining a corresponding value at each one of said N points of at least one of the following parameters; (a) translation velocity of said lens workpiece relative to the axis of said edging tool, (b) lens rotation rate, (c) edging tool speed and (d) force with which said lens workpiece is held against said edging tool whereby to define a succession of values of said parameters;
said servo means comprises means controlled by said microprocessor means for governing at least one of said parameters in accordance with the contents of said table in said memory; and
said processor means comprise means for fetching the corresponding value of said at least one of said parameters at each one of said N points and transmitting said value to said servo means, whereby to govern said one parameter at each one of said N points in accordance with said table stored in said memory.

5. The system of claim 4 wherein said succession of values of said parameters in said memory is determined by a trial and error method comprising:
grinding an edge of a lens workpiece on said edging tool while varying at least one of said parameters so as to realize a plurality of combinations of parameter values while monitoring said lens workpiece for overheating;
eliminating ones of said combinations for which said monitoring step senses overheating of said lens workpiece; and
storing in said table that combination having the highest edging tool speed for which no overheating was observed.

6. The system of claim 5 wherein said method is carried out at each one of said succession of said lens radii and lens rotation angles whereby to generate a set of corresponding successive entries for said table.

7. The system of claim 1 further comprising:
unload carousel means for storing a plurality of lens blanks to be edged on said edging tool;
load carousel means for storing a plurality of lenses formed by edging lens blanks on said edging tool;
unload arm servo means controlled by said microprocessor means for plucking a successive one of said lens blanks from said unload carousel means and placing it between said holding means; and
load arm servo means controlled by said microprocessor for taking a lens ground from a lens blank from said holding means and placing it in said load carousel means.

8. The system of claim 1 further comprising:
input means for receiving lens design data;
programmable means for computing from said lens design data said data representing said lens edge grinding trajectory and storing said lens trajectory data in said memory.

9. The system of claim 8 wherein said edging tool comprises a cylindrical portion and an apex portion for beveling said lens edge, and wherein said programmable means for computing said lens trajectory data includes means for accepting the following criteria in addition to said lens design data: (a) the angle included by said apex portion of said edging tool and (b) the radius of the cylindrical portion of said edging tool.

10. A method of operating a lens edging system which controls the movement of a lens workpiece with respect to a edging tool, said method comprising:
holding the edge of said lens workpiece against said edging tool so as to reduce said lens workpiece to a succession of radii while rotating said lens workpiece to a corresponding succession of rotation angles and while continually translating said lens workpiece axially across the surface of said edging tool so as to distribute wear across said edging tool surface.

11. A method of operating a lens edging system which controls the movement of a lens workpiece with respect to an edging tool, said lens workpiece having a major surface with a boundary of an initial contour bounded by a relatively thin edge of said workpiece, by grinding said edge so as to change said boundary of said major surface to a new boundary corresponding to a predetermined contour, said method comprising:
storing in said memory data representing a succession of lens rotation angles about an axis at least approximately normal to at least a portion of said major surface and a corresponding succession of lens radii, said lens radii defining said new boundary with respect to said axis;
fetching said succession of radii and said succession of rotation angles from said memory;
holding the edge of said lens workpiece against said edging tool so as to reduce said lens workpiece to the succession of radii fetched from said memory while effecting rotation relative to said edging tool of said lens workpiece to the corresponding succession of rotation angles fetched from said memory, whereby to change the contour of said major surface from said initial contour to said predetermined contour comparing the radius of said lens at a predetermined lens rotation angle to the correct radius and calculating an error therefrom; and reducing each one of said succession of radii in said memory by the magnitude of said error before edging a subsequent lens workpiece.

12. The method of claim 11 further comprising:
while holding said lens workpiece edge against said edging tool, translating said lens workpiece axially across the surface of said edging tool so as to distribute wear across said edging tool surface.

13. The method of claim 12 wherein said edging tool includes an apex portion for beveling the edge of a lens formed by said holding step from said lens workpiece, said method further comprising translating said lens axially across the surface of said apex portion while beveling the edge of said lens so as to distribute wear across the surface of said apex portion.

14. The method of claim 13 wherein said beveling step comprises rotating said lens while holding said lens edge against said apex portion of said edging tool by radially displacing said lens with respect to the surface of said apex portion in accordance with said succession of lens radii and said corresponding succession of lens rotation angles.

15. The method of claim 14 preceded by the step of determining a trajectory of said lens workpiece across said cylindrical and apex portions of said edging tool from a predetermined lens edge contour and lens curvature and from the included angle of said apex portion of said edging tool, and storing said trajectory in said memory, said trajectory corresponding to said succession of lens radii and lens rotation angles.

16. The method of claim 10 further comprising regulating at least some of the following parameters: the speed of said edging tool, the rate of rotation of said lens workpiece, the grinding force with which said lens workpiece is held against said edging tool and the velocity at which said lens is axially translated in accordance with a sequence of values stored in memory.

17. The method of claim 16 wherein the foregoing steps are preceded by:
determining an optimum set of values of at least some of said parameters for each one of a set of discrete points in time during said holding step and storing said optimum set in said memory as said sequence of values.

18. The method of claim 17 wherein said step of holding moves said lens workpiece in a trajectory with respect to said edging tool, and wherein said determining step comprises:
for each one of a plurality of discrete points in said trajectory, varying the values of at least some of said parameters while monitoring said lens workpiece for overheating so as to realize a plurality of combinations of said values at each one of said discrete points;
recording those of said combinations for which no overheating of said lens workpiece is detected;
for each one of the combinations recorded in said recording step, selecting one combination corresponding to the greatest productivity.

19. The method of claim 18 wherein said selecting step comprises selecting the combination having the highest edging tool speed.

20. The method of claim 18 wherein said monitoring step comprises observing said workpiece with spark detection means.

21. The method of claim 11 further comprising:
comparing the radius of said lens at a predetermined lens rotation angle to the correct radius and calculating an error therefrom; and
reducing each one of said succession of radii in said memory by the magnitude of said error before edging a subsequent lens workpiece.

* * * * *

UNITED STATES PATENT AND TRADEMARK OFFICE
CERTIFICATE OF CORRECTION

PATENT NO. : 5,148,637
DATED : Sep. 22, 1992
INVENTOR(S) : David L. Byron

It is certified that error appears in the above-indentified patent and that said Letters Patent is hereby corrected as shown below:

Column 4, line 37, change "eye" to -- edge --

Column 8, line 47, change angle "o" to -- angle $\alpha$ --;
line 52, change (68) to -- (66) --

Column 9, line 1, change "ideal lens same" to -- ideal lens radius at some --

Column 13, line 8, change "whereby" to -- wherein --

Signed and Sealed this

Twenty-fifth Day of January, 1994

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,148,637
DATED : September 22, 1992
INVENTOR(S) : David L. Byron

It is certified that error appears in the above-indentified patent and that said Letters Patent is hereby corrected as shown below:

Column 14, line 54, delete "comparing the radius of said lens at a predetermined lens rotation angle to the correct radius and calculating an error therefrom; and reducing each one of said succession of radii in said memory by the magnitude of said error before edging a subsequent lens workpiece"

Signed and Sealed this

Twenty-fourth Day of May, 1994

Attest:

BRUCE LEHMAN

Attesting Officer     Commissioner of Patents and Trademarks